United States Patent [19]

Hirose et al.

[11] Patent Number: 4,955,228

[45] Date of Patent: Sep. 11, 1990

[54] DEVICE FOR DETECTING ROTATION OF STEERING WHEEL FOR AUTOMOBILES

[75] Inventors: Hisashi Hirose; Kazuo Kouno, both of Aichi, Japan

[73] Assignee: Kabushiki Kaisha Tokai Rika Denki Seisakusho, Aichi, Japan

[21] Appl. No.: 436,947

[22] Filed: Nov. 14, 1989

Related U.S. Application Data

[63] Continuation of Ser. No. 397,369, Aug. 23, 1989, abandoned, which is a continuation of Ser. No. 278,916, Dec. 2, 1988, abandoned.

[30] Foreign Application Priority Data

Dec. 3, 1987 [JP] Japan .................. 62-184633[U]

[51] Int. Cl.$^5$ ............................................. G01M 19/00
[52] U.S. Cl. .................................................... 73/118.1
[58] Field of Search .............. 73/118.1, 431; 356/27, 356/373–375; 250/231 SE, 233, 578, 239; 324/173–175; 310/168

[56] References Cited

U.S. PATENT DOCUMENTS

| | | | |
|---|---|---|---|
| 3,857,285 | 12/1974 | Athey et al. | 73/431 |
| 4,406,946 | 9/1983 | Osanai | 250/231 SE |
| 4,683,375 | 7/1987 | Hoshino et al. | 250/231 SE |
| 4,686,362 | 8/1987 | Merlo | 250/231 SE |
| 4,700,062 | 10/1987 | Ernst | 250/231 SE |
| 4,751,888 | 6/1988 | Hanus | 250/231 SE |

FOREIGN PATENT DOCUMENTS

| | | | |
|---|---|---|---|
| 0066636 | 12/1982 | European Pat. Off. | 250/231 SE |
| 0171314 | 2/1986 | European Pat. Off. | 250/231 SE |
| 0075477 | 6/1977 | Japan | 324/175 |
| 0084130 | 4/1986 | Japan | 116/31 |
| 0175512 | 8/1986 | Japan | 250/231 SE |

*Primary Examiner*—Robert Raevis
*Attorney, Agent, or Firm*—Finnegan, Henderson, Farabow, Garrett and Dunner

[57] ABSTRACT

A device for detecting rotation of a steeering wheel for motor vehicles is disclosed which comprises an encoding member rotatable together with a steering wheel and having markers at predetermined position, a sensor so disposed as to correspond to a locus of rotation of the markers; and a signal generating circuit for generating pulse signals representative of information on the rotation of the encoding member whenever the sensor is caused to correspond to the markers. A first casing housing and rotatably holding the encoding member and a second casing housing and holding the signal generating circuit are formed integrally with each other.

6 Claims, 4 Drawing Sheets

DEVICE FOR DETECTING ROTATION OF STEERING WHEEL FOR AUTOMOBILES

This application is a continuation of application Ser. No. 07/397,369, filed Aug. 23, 1989 abandoned which was a continuation of application Ser. No. 07/278,916 filed Dec. 2, 1988 now abandoned.

BACKGROUND OF THE INVENTION

This invention relates to a device for detecting the rotation of a steering wheel for motor vehicles in which an information representative of the rotation of the steering wheel is outputted as electrical signals.

Recently, in order to achieve a better steering stability and a more comfortable ride in motor vehicles, it has been considered to control a damping force of a suspension, to control a gear shift position of an automatic transmission, and to control the steering of rear wheels (in case of a so-called four wheel drive steering system) in accordance with the angle of rotation of the steering wheel or steering angle in accordance with the angle of rotation of the steering wheel or steering angle and the running speed.

Conventionally, as one example of steering wheel rotation-detecting devices used for such controls, there has been provided an optical-type device having an encoding member comprising a disc which is rotatable with a steering shaft and has a plurality of through holes serving as markers in such a manner that the through holes are arranged in an annular form so as to be concentric with respect to the center of rotation of the disc, and two pairs of transmission-type photo-interrupters serving as sensors are disposed in such a manner as to correspond to the above array of through holes so that two kinds of pulse signals having different phases are obtained based on outputs of these photo-interrupters. In this case, the direction of rotation of the steering wheel can be detected based on the phase difference between the above two kinds of pulse signals, and also the amount of rotation of the steering wheel can be detected based on the number of these pulse signals. Conventionally, the encoding member is housed and held in a first casing, and the photo-interrupters as well as a signal generating circuit for producing the pulse signals based on the outputs of the photo-interrupters are housed and held in a second casing separate from the first casing. When the steering wheel rotation-detecting device is to be assembled, the first casing is first attached at a predetermined position, and then the second casing is attached relative to the first casing.

With the above construction having the separate first and second casings, the relative position between the encoding member and the photo-interrupters may be changed when an external force is applied to one of the casings at the time of the assembling, repair, inspection, etc., in which case it is sometimes impossible to obtain the pulse signals.

SUMMARY OF THE INVENTION

The present invention has been made in view of the above situation, and its object is to provide a device for detecting the rotation of a steering wheel for automobiles in which the positional relation between the encoding member and the sensors is not varied accidentally, and the precision in the detection of the rotating condition of the steering wheel can be kept good over a prolonged period of time.

According to the present invention, there is provided a device for detecting the rotation of a steering wheel for automobiles comprising an encoding member rotatable together with a steering wheel; and a signal generating circuit for generating a pulse signal representative of information on the rotation of the encoding member each time each marker on the encoding member is caused to correspond thereto. A first casing rotatably housing and holding the encoding member and a second casing housing and holding the signal generating circuit are formed integrally with each other.

The first casing which houses and holds the encoding member is formed integrally with the second casing which houses and holds the signal generating circuit including the sensors.

DESCRIPTION OF THE PREFERRED EMBODIMENTS

Figure 1:
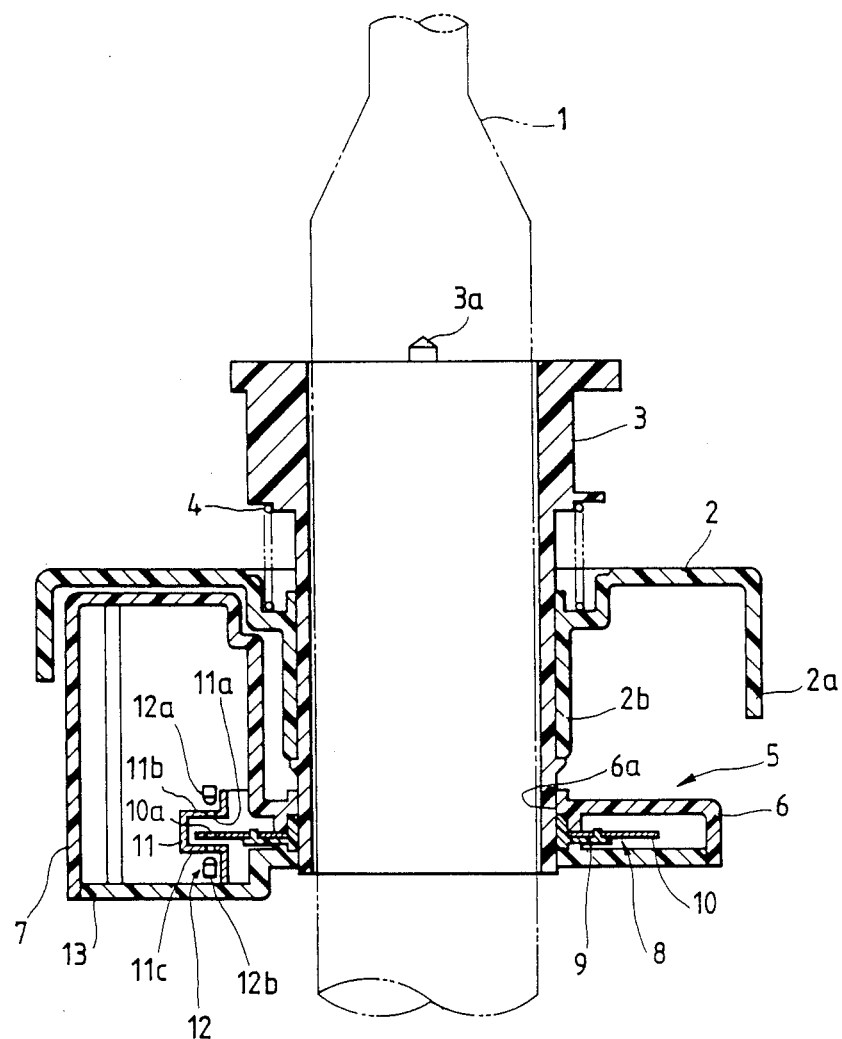
FIG. 1 is a vertical cross-sectional view of the overall construction of a device according to the invention.

In FIG. 1, a steering shaft 1 is connected to a steering wheel (not shown), and a base 2 is made of, for example, plastic material and fixed at a suitable fixed position in surrounding relation to the steering shaft 1. The base 2 is of a double-cylinder construction having an outer peripheral wall 2a and an inner peripheral wall 2b. A cylindrical connecting member 3 is rotatably interposed between the steering shaft 1 and the inner peripheral wall 2b of the base 2. Connecting member 3 is made of, for example, plastic material. The connecting member 3 has a projection 3a formed on its upper surface that is received in a recess (not shown) provided on the steering shaft 1 so that the connecting member 3 is rotatable together with the steering wheel. A compression coil spring 4 is interposed between the connecting member 3 and the base 2 in surrounding relation to the connecting member 3, so that the connecting member 3 is normally urged toward the steering wheel.

Figure 2:
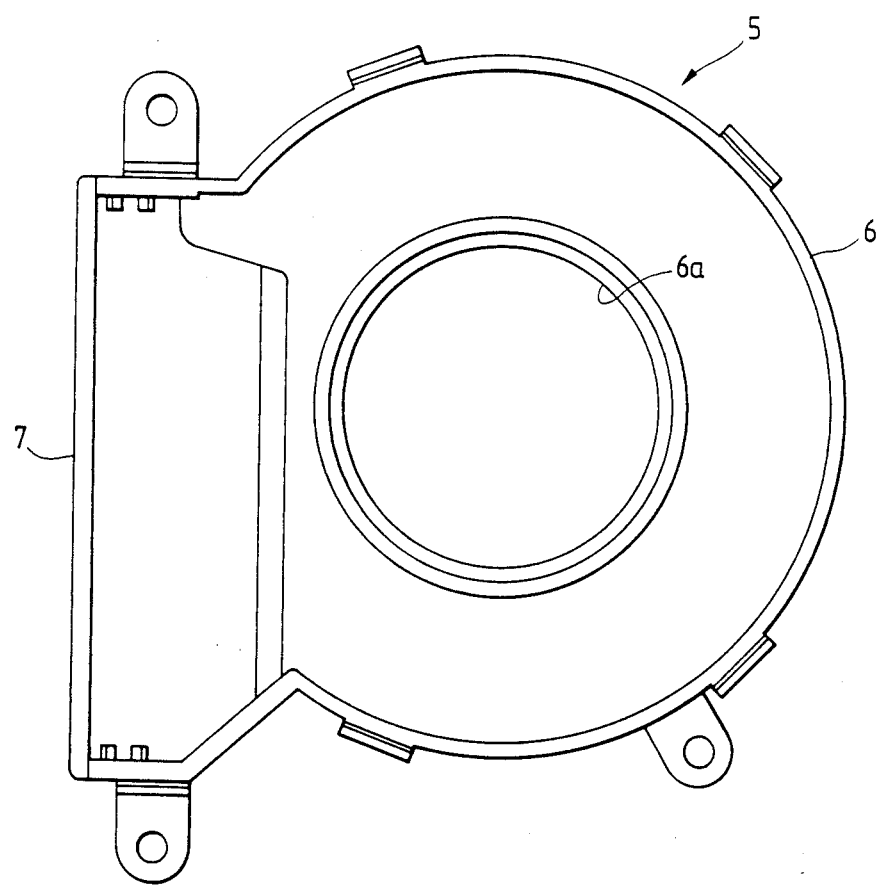
FIGS. 2 and 3 are an enlarged bottom end view and enlarged vertical cross-sectional view of a primary portion thereof, respectively.
Figure 3:
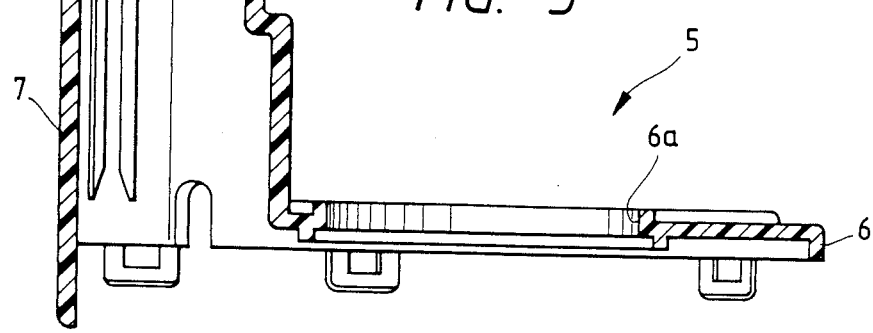

A casing unit 5 of plastic material is attached below the base 2, the casing unit comprising a first casing 6 in the form of a shallow annular container, and a second casing 7 formed integrally with the first casing 6 and disposed at the side of the first casing in such a manner that internal spaces of both casings are continuous to each other, as shown in FIGS. 2 and 3 on an enlarged scale. A circular hole 6a is formed through the first casing 6, and, the connecting member 3 is rotatably disposed in the circular hole 6a.

Figure 4:
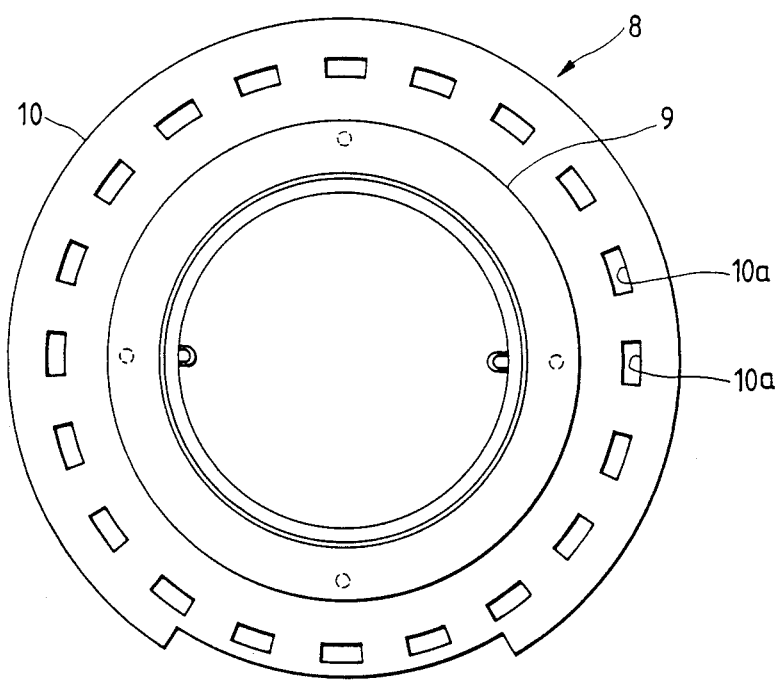
FIG. 4 is an enlarged bottom end view of an encoding member.

An encoding member 8 is rotatably housed within the first casing 6. The encoding member 8 has a plan view as shown in FIG. 4, and comprises an annular rotor 9 of plastic material fitted on a lower portion of the outer periphery of the connecting member 3 for rotation therewith. An annular encoding plate 10 made of metal is fixedly secured to the rotor 9. The peripheral marginal portion of the encoding plate 10 extends radially outwardly from the rotor 9, and a plurality of through holes 10a, serving as markers, are provided at this extended portion in an annular form, for example, at the same pitch and are arranged in concentric relation to its center of rotation.

On the other hand, a holder 11 is fixedly mounted to the second casing 7 and has opposed arms 11b and 11c between which a recess 11a receiving the peripheral marginal portion of the encoding plate 10 is formed. Sensors, such for example as two pairs of transmission-type photo-interrupters 12, having optical axes disposed perpendicular to the locus of rotation of the through holes 10a of the encoding plate 10, are mounted on the arms 11b and 11c. More specifically, the photo-interrupter 12 has a light-emitting diode 12a and a photo-transistor 12b which are disposed in opposed relation to each other through the recess 11a, and each time the photo-transistor 12b receives light from the light-emitting diode 12a through the through hole 10a, the photo-transistor outputs a pulse-like light-receiving signal. This pulse-like light-receiving signal is converted to a pulse signal representative of the amount of rotation of the encoding member 8 (in other words, the steering wheel) by a signal processing circuit (not shown) housed and held in the second casing 7. The pitch Pw of arranging of the two pairs of photo-inturrupters 12 is set as follows where the pitch of arranging of the through holes 10a is represented by λ:

$$Pw = (n + \tfrac{1}{4})\lambda$$

where n is an integer.

Figure 5:
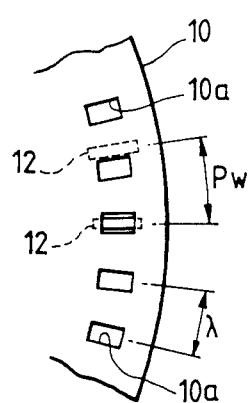
FIG. 5 is an enlarged plan view explanatory of the positional relation between the encoding member and markers.
Figure 6:
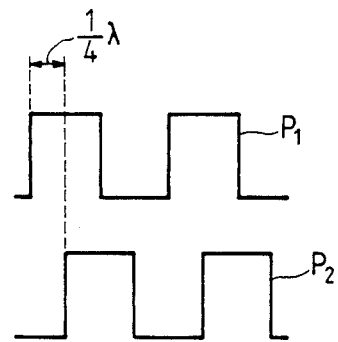
FIG. 6 is an illustration showing characteristics of outputs of sensors.

In this embodiment, as shown in FIG. 5, by selecting "n=1" in the above formula, it is set to $Pw=(1+\tfrac{1}{4})\lambda$. Therefore, in accordance with the rotation of the steering wheel and hence the encoding member 8, the photo-interrupters 12 output two kinds of pulse-like light-receiving signals $P_1$, $P_2$, respectively, which are different in phase by $(\tfrac{1}{4})\lambda$, as shown in FIG. 6. The signal processing circuit (not shown) output two kinds of pulse signals synchronous with the above signals, respectively. As a result, not only the angle of rotation of the steering wheel can be detected by the above two kinds of pulse signals but also the direction of rotation of the steering wheel can be detected based on the phase difference information of the pulse signals.

Figure 7:
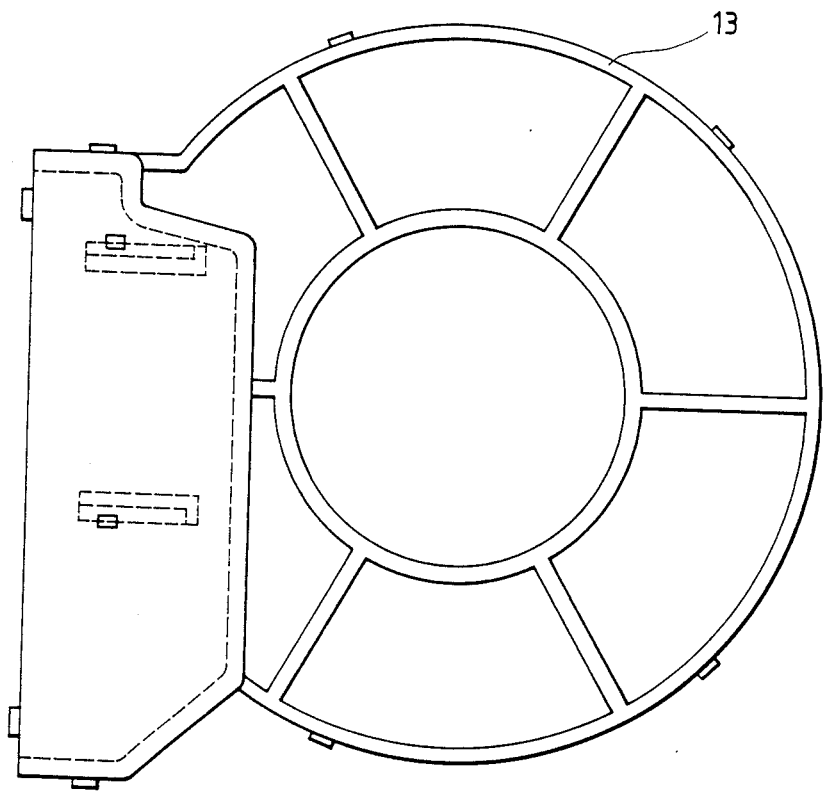
FIG. 7 is an enlarged bottom end view of a lid for first and second casings.

A lid 13 of plastic material is used for closing the openings of the first and second casings 6 and 7, and has a plan view as shown in FIG. 7.

In the embodiment of the invention, since the first casing 6 that houses the encoding member 8 and the second casing 7 that houses and holds the photo-interrupters 12 and the signal generating circuit (not shown) are formed as one casing unit 5, the positional relation between the encoding member 8 and the photo-interrupters 12 will not be accidentally changed from the initially-set condition. As a result, there is no risk that precision in detection of rotation of the steering wheel will be accidentally lowered for the reason that the optical axes of the photo-interrupters 12 is brought out of agreement with the through holes 10a and for other reasons. Therefore, precision in detecting of the rotating condition of the steering wheel can be kept accurate over a prolonged period of time. In addition, since the first and second casings 6 and 7 are formed integrally with each other, the operation for attaching it is facilitated, so that the assembling efficiency is enhanced.

In the embodiment, although the rotation detecting device of the optical type comprising the encoding member 8 with the through holes 10a and the transmitting-type photo-interrupters 12 has been described, the device is not to be restricted to it and may be of the optical type employing reflecting-type photo-interrupters or of the magnetic type using a permanent magnet and a magnetic flux sensor in combination.

As is clear from the foregoing, according to the present invention, in the device for detecting the rotation of the steering wheel for automobiles comprising the encoding member rotatable together with the steering wheel and having the markers at the predetermined positions, the sensors being so disposed as to correspond to the locus of rotation of the markers. The signal generating circuit is used for generating pulse signals representative of the amount of rotation of the encoding member each time the sensors are caused to correspond to the markers. The positional relation between the encoding member and the sensor will not accidentally be varied, whereby the precision in the detection of the rotating condition of the steering wheel can be kept good over a prolonged period of time.

We claim:

1. A device for detecting rotation of a steering wheel and steering shaft for motor vehicles, comprising:
   a cylindrical connecting member rotatable with the steering wheel and having a projection for engagement with the steering shaft and a radially extending lip;
   an encoding member rotatable together with the steering shaft and the steering wheel and having markers at predetermined positions;
   a sensor disposed adjacent a locus of rotation of said markers;
   signal generating means for receiving information from said sensor and for generating pulse signals representative of information on the rotation of said encoding member each time said encoding member is rotated past said sensor;
   a base having an inner cylindrical wall concentric with both said connecting member and the steering shaft and an outer cylindrical wall spaced a predetermined distance from said inner wall, said connecting member and the steering shaft being rotatable within said base;
   a storing interposed between said base and said radially extending lip of said connecting member;
   a first casing for housing said encoding member, said encoding member being rotatable at least partially within said first casing;
   a second casing for housing and holding said signal generating means, said second casing being integrally formed with said first casing, said second casing having a lower portion and an upper portion and being disposed beneath said base between said inner and outer walls thereof; and
   an arm mounted within said second casing on said lower portion, said arm having a substantially u-shaped central area extending about the edge of said encoding member, said sensor being disposed on said arm adjacent to a locus of rotation of said markers.

2. The device of claim 1, wherein said encoding member is composed of a rotor made of plastic and an encoding plate made of metal and coupled to said rotor.

3. The device of claim 1, further comprising a cylindrical connecting member rotatable together with a steering shaft, said first and second casing including a lid for forming a closed cavity for housing said encoding member.

4. A device for detecting rotation of a steering wheel and steering shaft for motor vehicles comprising:
- a cylindrical connecting member rotatable with the steering wheel and having a projection for engagement with the steering shaft and a radially extending lip;
- a base having an inner cylindrical wall concentric with both said connecting member and the steering shaft and an outer cylindrical wall spaced a predetermined distance from said inner wall, said connecting member and the steering shaft being rotatable within said base;
- a spring interposed between said base and said radially extending lip of said connecting member;
- an encoding member rotatable together with the steering shaft and said connecting member, said encoding member having markers at predetermined positions;
- a first casing for housing said encoding member, said encoding member being at least rotatable within said first casing;
- a second casing having a lower portion and an upper portion and being disposed beneath said base between said inner and outer walls thereof;
- an arm mounted within said second casing on said lower portion, said arm having a substantially u-shaped central area extending about the edge of said encoding member;
- a sensor disposed on said arm adjacent to a locus of rotation of said markers; and
- signal generating means for receiving information from said sensor and generating pulse signals representative of information on the rotation of said encoding member.

5. A device set forth in claim 4 wherein said encoding member includes a rotor and an encoding plate disposed about said rotor.

6. A device as set forth in claim 4 wherein said sensor includes a photo-interrupter and a light emitting diode disposed on opposite sides of said encoding member.

* * * * *